United States Patent [19]

Flores et al.

[11] Patent Number: 5,241,977
[45] Date of Patent: Sep. 7, 1993

[54] PORTABLE COVER SYSTEM APPARATUS FOR VEHICULAR AND OTHER OUTDOOR USE

[75] Inventors: Victor Flores; Conrado A. Bernardo; Mark J. Antosh, all of Tucson, Ariz.

[73] Assignee: Go-Products, A General Partnership, Tucson, Ariz.

[21] Appl. No.: 875,757

[22] Filed: Apr. 28, 1992

Related U.S. Application Data

[63] Continuation-in-part of Ser. No. 523,354, May 14, 1990, abandoned.

[51] Int. Cl.$^5$ .................................................. E04H 15/06
[52] U.S. Cl. ......................................... 135/88; 135/113; 135/119
[58] Field of Search .......................... 135/87–89, 135/98, 99, 115, 119, 113, 107, 108, 109

[56] References Cited

U.S. PATENT DOCUMENTS

| | | | |
|---|---|---|---|
| 553,735 | 8/1895 | Murgatroyd . | |
| 1,853,742 | 4/1932 | Owen et al. . | |
| 2,059,463 | 11/1936 | Kemp | 135/98 |
| 2,221,366 | 11/1940 | Bisbing et al. | 135/98 X |
| 2,480,509 | 8/1949 | Ripley | 135/3 |
| 2,508,757 | 5/1950 | Gray | 135/5 |
| 2,515,993 | 7/1950 | Faasse | 135/20 |
| 2,605,778 | 8/1952 | Clapper | 135/46 |
| 2,608,942 | 9/1952 | Smith | 135/115 X |
| 2,652,845 | 9/1953 | O'Neill et al. | 135/98 X |
| 2,798,501 | 7/1957 | Oliver | 135/4 |
| 2,989,967 | 6/1961 | Lee | 135/88 |
| 3,036,583 | 5/1962 | Miller | 135/4 |
| 3,304,035 | 2/1967 | Davis | 248/40 |
| 3,349,784 | 10/1967 | Roberts | 135/5 |
| 3,463,174 | 8/1969 | Heller | 135/1 |
| 3,940,099 | 2/1976 | McCleskey | 135/88 X |
| 3,992,053 | 11/1976 | Hrytzak et al. | 296/136 |
| 4,605,030 | 8/1986 | Johnson | 135/113 X |
| 4,655,236 | 4/1987 | Dorame | 135/88 |
| 4,825,889 | 5/1989 | Monteith | 135/88 |
| 4,834,128 | 5/1989 | Burgess | 135/88 |
| 4,886,083 | 12/1989 | Gamache | 135/88 |

Primary Examiner—Carl D. Friedman
Assistant Examiner—Lan M. Mai
Attorney, Agent, or Firm—Victor Flores

[57] ABSTRACT

A portable cover apparatus for use in vehicular and outdoor applications where sheltering, such as shading from the sun and other environmental elements is desired. The apparatus includes a flexible cover adequate for the particular environmental covering task at hand, i.e. mesh or closed sheet material, supported by structurally independent mast and base supports. Each independent base support has a horizontal anchoring portion, and a vertically offset mast attachment portion that coacts with a telescoping variable length mast to accommodate various shapes and positioning of the flexible cover. In a preferred embodiment, the cover may be attached to the upper mast ends using hook-ended stretch cords, as a method of compensating for different sizes of objects to be covered as well to absorb stress from wind. The side curtains are detachable from the top cover using mating hook and loop fastening material. The portable covering application determines the number of independent mast and base supports required according to the geometrical configuration of the sheet covering material. The horizontal portion has suitable structure for receiving a weighted body, such as the wheels of an automobile and may include auxillary holes for anchoring to the ground. The manner of anchoring is discretionary considering the duration of the covering needs, surface hardness, security from theft of the covering apparatus, time to install, patience of the installer and other related human factor considerations.

7 Claims, 4 Drawing Sheets

PORTABLE COVER SYSTEM APPARATUS FOR VEHICULAR AND OTHER OUTDOOR USE

RELATED APPLICATIONS

This application is a continuation-in-part of U.S. patent application Ser. No. 07/523,354, filed on May 14, 1990 now abandoned.

FIELD OF THE INVENTION

This invention relates to cover apparatus and methods of sheltering objects from over exposure to environmental elements such as the sun and damaging hail storms. More particularly, the present invention relates to portable cover apparatus and methods for sheltering objects as noted above. Even more particularly, the present invention relates to portable shade cover apparatus and methods of sheltering vehicles from over exposure to the sun and of sheltering humans from damaging sunlight when engaged in outdoor activities.

DESCRIPTION OF THE PRIOR ART

The unpredictable nature of the environment has caused humans to find shelter from its elements such as the rain, snow and sun. The shelters traditionally are permanent such as a house for humans and garages for personal property, such as the vehicles used by humans for transportation. Since humans tend to move about in daily life, shelter from the environment is still desirable, i.e. an umbrella provides a suitable shelter from rain or sun, the vehicle's cab provides better shelter than an umbrella while moving about, a tent or canopy may provide the necessary shelter if stopping outdoors for recreation purposes, or another permanent shelter may be used to work in during the day. If stopping for recreation purposes, dedicated tent shelters are used by humans to shelter from the sun or rain, or other environmental elements. As has been the case throughout time, the transportation means also needs shelter, so permanent and temporary tents have been provided for these transportation means, be it animal or vehicular. The shelter desired by humans for themselves or for their transportation means, is not always provided due to the combination of the shelter's bulkiness, heavy weight, awkwardness of assembly and oftentimes a high cost. Thus humans are continually searching for portable shelter to cover themselves or their transportation means in todays mobile society. The efforts expended in solving a portable shelter problem are typically frustrated by redesign of a particular transportation means, thereby making the shelter solution obsolete. Further the duality of the portable shelter problem is compounded, i.e. there is still a need for a portable shelter for the human and a portable shelter for the transportation means.

Prior art considered as exemplary solutions of the continuing portable sheltering problem include the following:

U.S. Pat. No. 553,735, 2,515,993, 2,605,778 and 3,304,035 pertain to umbrella type structures including fabric cover in combination with mechanical parts that articulate to permit occupancy of persons beneath the umbrella. Of particular interest in the foregoing patents is that structure that allows articulation of the umbrella member about an anchor object. While these patents solve a shelter problem, their means of anchoring is for a particular end use device, generally requiring a tubular structure, such as those found in bicycles and carts, or the like.

U.S. Pat. Nos. 2,798,501, 3,036,583, 3,463,174, 4,834,128 and 4,886,083 are example solutions of portable vehicle covers teaching the use of the vehicle's weight to anchor a framework and cover combination that completely encloses the vehicle in a cocoon-like manner. The framework/cover structure of these solutions, while providing adequate sheltering for an enclosed vehicle, is viewed as awkward for storing and generally fail to provide an appealing portable cover structure. Further, the enclosed nature is not particularly appealing when shading the vehicle from the sun is the only objective of a user. In all likelihood, a high cost is associated with the cocoon-like structure that outweighs serious consideration in using. Another disadvantage is its dedicated nature for vehicular use, see U.S. Pat. No. 2,480,509 where the use of a vehicle is taught to anchor a side tent structure for human use. See also the CARBANA protection system currently being marketed by Carbana Inc, from Syosset, N.Y.

Other less complicated sheltering apparatus are found in U.S. Pat. Nos. 1,853,742 and 3,992,053 wherein a rolled covering material is anchored at one end of a vehicle and extendably draped over the vehicle to provide sheltering. One notable disadvantage is the necessary contact with exterior finished portions of the vehicle which are not traditionally acceptable anchor points to effect the sheltering. Similar disadvantage is found in U.S. Pat. No. 3,349,784 wherein anchor hooks must be utilized to secure the cover to the fenders of a vehicle and a suction cup is placed on its roof.

U.S. Pat. Nos. 2,508,757 and 4,655,236 teach portable cover apparatus that shelters a vehicle, but lack versatility in use for other than vehicular application in that a base for the mast is adapted for attaching to a particular part of a vehicle. In the teachings of U.S. Pat. No. 2,508,757, the parts of the vehicle are the front and rear bumper, while in the case of U.S. Pat. No. 4,655,236, the part of the vehicle is the body of the tire to which the base structure must be attached. The '236 Patent specifically teaches away from mast base structures that have platforms onto which the vehicle must be driven to anchor or support the masts. While the '236 Patent does teach the advantage of having the masts at an incline, there is no mention of having arcuate adjustment coacting with the telescoping mast to simultaneously accommodate different cover sizes at different heights. Also the multiple parts that have to be assembled to form the mast base presents a certain degree of complexity that detracts from the portable nature for quick assembly and use. Further, the attachment method of the '236 Patent lacks appeal in that a user appears to have to wrestle a traditionally dirty vehicle tire to install the cover, which upper part of the tire is not readily accessible in many vehicles.

Although the prior art has provided many solutions for portably sheltering vehicles and humans in outdoor activities, only the umbrella and the guy wire anchored tent have been widely accepted. The solutions taught by the prior art have failed to achieve commercial success worthy of universal acceptance of luggage-type of portability and dual shelter application for both vehicular and outdoor shelter applications. The lack of commercial success of prior art teachings is observed daily by countless number of vehicles baking in the sun while the owner is at work. The impact to the environment is reflected in the fuel wasted to air condition the vehicle's interior after it has been baked in the sun.

Therefore, a need is seen to exist for a portable cover apparatus that is primarily suited for vehicular shelter applications, but that can also be readily utilized for human outdoor shelter applications.

A need is seen to exist for a portable cover apparatus that is easily setup without repeated assemblage of parts and that can be anchored by mere placement of weighted objects on platform base portions.

A need is seen to exist for a portable vehicle shade system that meets the fast setup objective of the foregoing by driving onto a platform and that can accommodate a plurality of cover sizes.

A need is seen to exist for a portable vehicle shade system that meets the fast setup objective, that is provided with alternate anchor means that allows the vehicle being driven off to form an outdoor shade structure.

A need is seen to exist for a portable vehicle cover system that meets the foregoing and that is sized to fit in a carrying bag in acceptable luggage-type or duffel bag sizes to promote portability.

A need is seen to exist for a portable shade apparatus that meets the foregoing fast setup and versatile base features for both platform and stake type of anchoring and that allows use of a wide variety of cover shapes.

A need is also seen to exist for a portable cover apparatus for a vehicle that makes use of traditional vehicle rooftop flanges for mounting in a piggy-back manner.

SUMMARY OF THE INVENTION

Accordingly, the primary object of the present invention is to provide a portable cover apparatus that is primarily suited for vehicular shelter applications but that can also be readily utilized for human outdoor shelter applications.

Another object of the present invention is to provide a portable cover apparatus that is easily setup without repeated assemblage of parts and that can be anchored by mere placement of weighted objects on platform base portions.

Another object of the present invention is to provide a portable vehicle shade system that meets the fast setup objective of the foregoing by driving onto a platform and that can accommodate a plurality of cover sizes.

Another object of the present invention is to provide a portable vehicle shade system that meets the fast setup objective, that is provided with alternate anchor means that allows the vehicle being driven off to form an outdoor shade structure.

Another object of the present invention is to provide a portable vehicle cover system that meets the foregoing and that is sized to fit in a carrying bag in acceptable luggage-type or duffel bag sizes to promote portability.

Another object of the present invention is to provide a portable shade apparatus that meets the foregoing fast setup and versatile base features of having both platform and stake type of anchoring and that allows use of a wide variety of cover shapes.

A related object of the present invention is to provide a portable cover apparatus for a vehicle that makes use of traditional vehicle rooftop flanges for mounting in a piggy-back manner.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating but one of the various ways in which the invention may be practiced.

DESCRIPTION OF THE PREFERRED EMBODIMENT

Figures 1, 2, 3, 3A, 4:
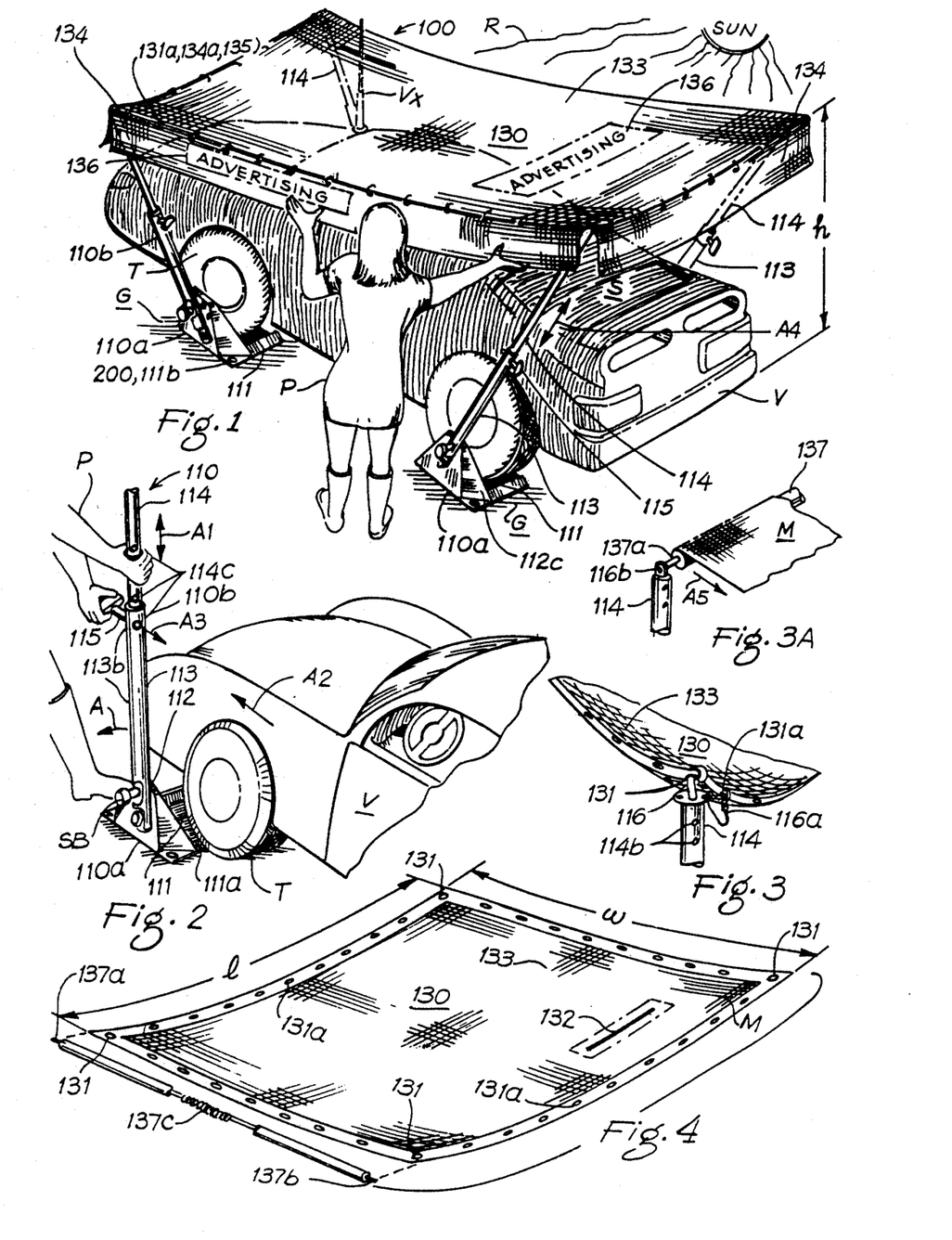
FIG. 1 is a perspective view of the present invention illustrating a vehicle shade system embodiment with emphasizes on the use of the vehicle's tire driven atop the platforms of the mast bases to effect anchoring the shade system.
FIG. 2 is a perspective view of a typical initial placement of a mast means whose combination base and mast members are easily positioned ahead of a vehicle's tire prior to driving the vehicle onto the platform member.
FIG. 3 is a closeup view of a corner portion of the cover means secured to an upper portion of the mast means, showing a hook and cover latching clamp in place.
FIG. 3A is a fragmented view of a corner portion of a mechanized cover means having a spring-loaded rod rotatably secured to a bearing means provided on an upper portion of the mast means.
FIG. 4 is a rectangular cover means shown in a mesh sunscreen fabric and adapted with a slot for accommodating an antenna typically found on vehicles, a spring-loaded rod is shown detached to depict a mechanized version of the cover means.
Figure 10:
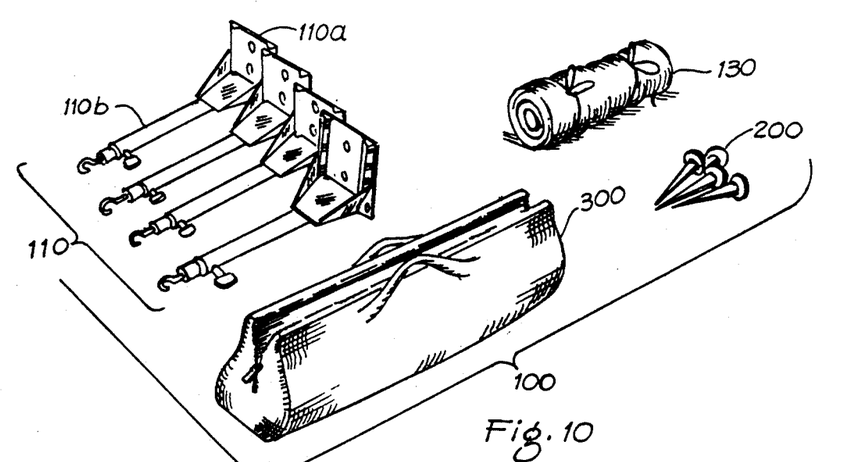
FIG. 10 is a perspective view of a portable cover system in kit form comprising four mast means in a retracted, ready-to-position state, a rolled cover means and stakes in case a vehicle is not to be used to anchor the setup cover system.
Figures 11, 12:
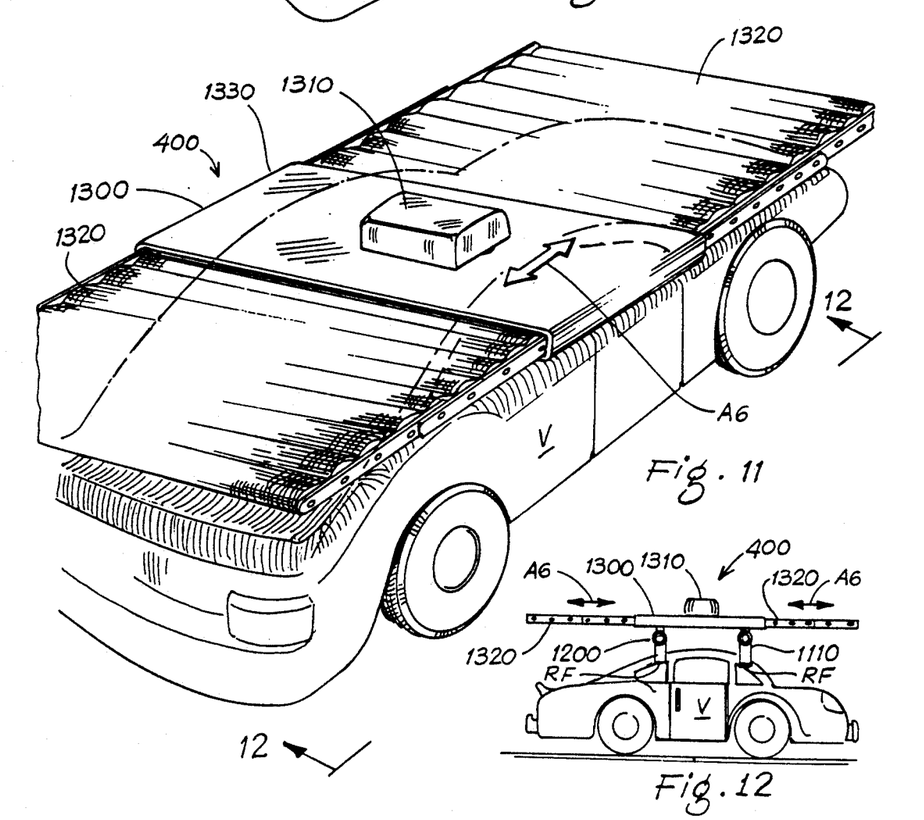
FIG. 11 is a vehicular cover embodiment that provides structure that allows portability by virtue of a mast means that couples to perimeter flanges commonly found on roofs of vehicles and includes a cover means having a mechanized member coacting with a fabric member.
FIG. 12 is a side view of the vehicle cover embodiment taken along line 12—12 in FIG. 11.

FIG. 1 illustrates a cover apparatus 100 set up in a vehicular application providing shade S from rays R coming from the SUN. FIG. 10 shows apparatus 100 in a preferred kit form, where a bag 300 is provided for portability of a plurality of mast means 110, a cover means 130 and at least one anchor 200. Mast means 110 is preferably manufactured from a lightweight material, such as galvanized sheet metal, or equivalent plastic material. The object being that means 110 will withstand rugged outdoor elements and user abuse. Anchor means 110 is preferably a free standing structure, including a base member 110a and a variable length mast member 110b.

Figures 5, 6, 7, 8, 9:
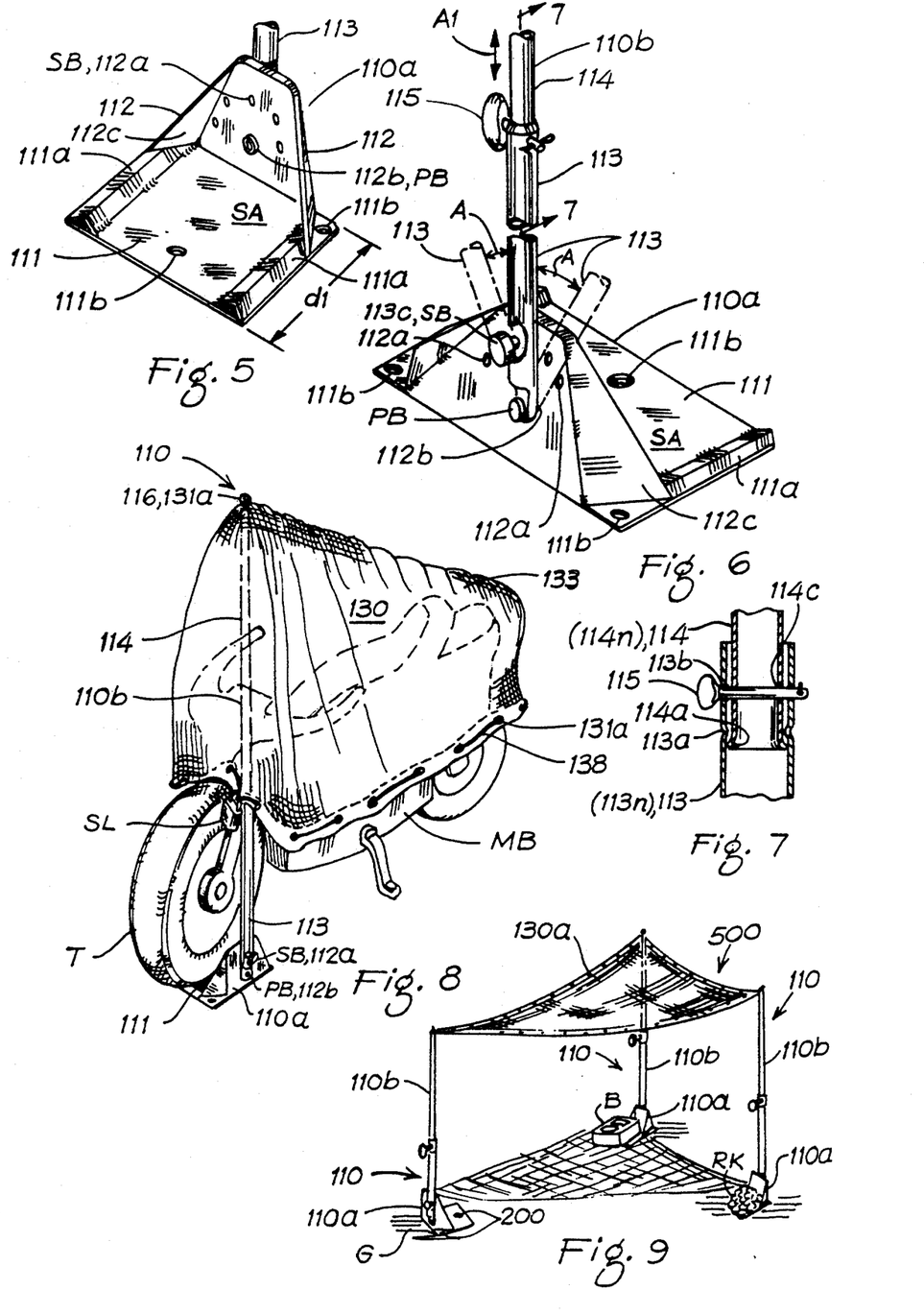
FIG. 5 is a closeup perspective view of the base platform member showing the wide surface area that allows upright positioning, the anchored state indicator bumps, an alternative set of anchor holes, the pivot and arcuate arrangement of mast mounting holes that compensate for height and size variations of the cover means.
FIG. 6 is a view of the coupled base member and mast member illustrating a telescopic unit arrangement of the mast member, the arcuately positioning of the mast member made possible by the arcuate set of holes on the mast attachment portion provided on the base.
FIG. 7 shows a cross-sectional view taken along the line 7—7 in FIG. 6 illustrating a dimpled and flared out portions on the mast units to prevent separation of the units.
FIG. 8 is a perspective view of a motorcycle sheltering application where at least one mast means is anchored by a wheel of the motorcycle and the mesh covering is secured to an extended mast member and draped over the body and secured by a lock attached to a drawstring.
FIG. 9 is an outdoor activity cover apparatus, showing a triangular shaped cover and the use of the same base as used in the vehicular application except arbitrary weighted objects and stakes are used to anchor the cover apparatus.
Figure 14:
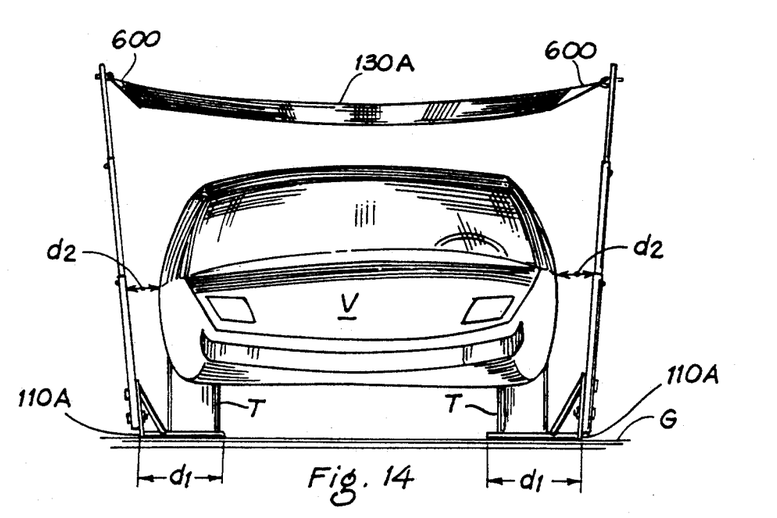
FIG. 14 is a frontal view taken along line 14—14 in FIG. 13 illustrating the tubular constructed base members supported by a vehicle's tires, and also illustrating the drive-on anchored state indicator bumps, and also illustrating the offset of the mast attachment portion effected by the design of the base's horizontal and vertical members which prevent contact of the mast member with a vehicle using the shade system.

As best seen in FIGS. 5 and 6, base member 110a includes a first anchor facilitating means in the form of a platform 111 and a mast attachment portion 112. Platform 111 is designed having a surface area SA for effecting the free standing base state, as well as for receiving a weighted anchor object, such as a vehicle V, see FIG. 1, a concrete block B or rocks RK, see FIG. 9. Platform 111 is also provided with a second or alternate anchoring means in the form of holes 111b for receiving an anchor, such as the kit provided anchors 200 that penetrate ground G, see FIG. 1 where holes 111b and anchors 200 are optionally used to assure that apparatus 100 remains anchored when vehicle V is driven off, and FIG. 9 where a triangularly shaped cover means 130a is used in outdoor cover apparatus 500 that utilizes mast means 110 anchored by a combination weighted objects RK and B and anchors 200. Platform 111 is also provided with bumps means 111a for indicating an anchored home-position to a driver driving said vehicle V atop said platform member 111. Platform 111 is preferably designed having an offset width d1 and mast attachment portion 112 is preferably provided with side braces 112c, such that when base means 110a is positioned forward of a tire T, mast means 110b is offset away by an amount d2 from the side of vehicle V to prevent interference and inadvertent contact with the paint and other finished body parts of vehicle V, see FIG. 14 illustrating a frontal view of a vehicle using the cover system with tubular base structures 110A designed to effect the offset d2.

As shown in FIGS. 5 and 6, base member 110a also includes a mast attachment portion 112 having compensating means in the form of arcuately arranged holes 112a and pivot hole 112b, for coacting with mast member 110b to accommodate placement of a variety of fixed shaped cover means over an object being sheltered. For example, cover means 130 as shown in FIG. 4, is a rectangularly shaped cover means having a length l and a width w. In a vehicular application, width w would probably remain constant, typically seven feet, while the length l would vary depending on whether a van, a pick-up, a sub-compact, compact, medium or luxury vehicle is to be sheltered, typically twelve (12) feet to eighteen (18) feet. Any one given size of cover 130 could be used at different height h (see FIG. 1) but would require articulation of mast member 110b about mast attachment portion 112. By example, FIGS. 5 and 6 show mast upper end portion 114 capable of being telescopically adjusted, as indicated by arrow A1, and being secured by a retaining pin 115. Mast bottom end portion 113, which is pivotally coupled to pivot hole 112b using pivot bolt PB, is capable of being arcuately adjusted about holes 112b, as indicated by arrows A, and being securely attached, using secure bolt SB, to a corresponding one of the plurality of arcuately arranged holes 112a upon reaching the desired height. The articulation sequence may be reversed at user's discretion. The arcuate angular spacing, by example, is approximately 15 degrees to get plus/minus 45 degrees from a 12 o'clock position of mast member 110b. The coacting feature of base member 110a with mast member 110b on every mast means 110, when arranged with other mast means 110, as shown in FIG. 1, can accommodate many height settings h of a particularly sized cover means 130. The arcuate compensating holes 112a are particularly useful when mast means 110 are placed inward of corner eyelets 131 of cover means 130, see FIG. 1. A placement of mast means 110 directly beneath a corner eyelet 131 at different height settings, would only require telescoping adjustment of mast member 110b, leaving bolt SB set at 12 o'clock arcuate adjustment position, see FIG. 9.

FIG. 7 shows the mast member securement feature of the present invention whereby at an upper end portion of lower mast portion 113, a dimpled or crimped portion 113a is formed for interlocking with a flared out lower end portion 114a of upper mast portion 114. Also shown in FIG. 7 is retaining pin 115 used to connect telescoping units 113 and 114 once a desired length of mast member 110b is reached. It should be understood that a plurality of unit 113n and 114n having the same interlocking and connecting arrangement 113a, 114a, as mast units 113 and 114 may be required to obtain a desired overall length of mast member 110b.

FIG. 3 shows the upper end of upper mast portion 114 having a set of keeper holes 114b for conveniently storing retaining pin 115 when mast means 110 is in a retracted state and otherwise not interconnecting mast members 113 to 114. FIG. 3 further shows a corner eyelet 131 of cover means 130 secured to a hook member 116 mechanically coupled to the distal end of upper mast portion 114. A security latching strap 116a is connected between hook member 116 and a proximate peripheral eyelet 131a.

Referring now to FIGS. 1 and 2, where in FIG. 2, a mast means 110 is shown in a typical vehicular application where a base member 110a is positioned ahead of a tire T of vehicle V in a fully stopped state for subsequently being driven over bump 111a and onto platform 111. Bumps 111a are not restrictive as to require a forceful climb nor should they cause any tipping of the mast means 110 upon being driven onto. Mast means 110 is free standing and positioning immediately forward of tire T is for purposes of minimizing the forward distance necessary to firmly anchor mast means 110 with the vehicle. However, as a safety precaution, under no circumstances should a person P continue holding mast means 110 while vehicle V is being driven forward as indicated by arrow A2. Further, the person P should be an adult, or at minimum a person capable of following the above noted safety precaution. Adjustment of mast member 110b as indicated by arrow A and A1 is determined by the particular sheltering task at hand and thus may vary during the sequence of steps for setting up apparatus 100 to provide the necessary shelter. By example, a user may already have a preset arcuate angular setting of mast member 110a with bolt SB securedly connecting lower mast portion 113 to mast attachment portion 112, in which case, during the initial placement of mast means 110, an initial height setting may be set by removing retaining pin 115 from a keeper hole 114b to an intermediate hole setting 114c on upper mast portion 114 through a pinning hole 113b on lower mast portion 113 as indicated by arrow A3. It should be noted that the method of connecting one mast unit to another is shown here by example only, and other equivalent methods may be employed to accomplish the same function.

Thus, as shown in FIG. 1, four mast means 110 are anchored by vehicle V's tires T driven atop of platform 111 and cover means 130 is tautedly secured in place. Typically, after having positioned vehicle V onto base members 110a, a user person P would then secure hook member 116 to corner eyelets 131 and complete set up of apparatus 100 to a desired height setting h by extending upper mast portion 114 as indicated by arrow A4 and securing portion 114 to lower mast portion 113 using retaining means 115. Also shown in FIG. 1 is the alternate anchoring of mast means 110 whereby holes 111b are utilized for driving anchor means 200 therethrough into ground G. Also shown in FIG. 1 and further in FIGS. 3 and 4, is a cover means 130 depicted as a shade shelter, preferably a mesh fabric M having mesh openings 133 providing, by example, 65% to 80% shading. While 100% shading is possible using canvas, or equivalent material, adverse affects may result that would detract from a preferred shading application, i.e. the impact of wind, rain, snow would have to be considered, and may require a design of component parts commensurate with the end use application. While a flat sheet design of cover means 130 may suffice for sheltering during the most intense periods of delivery of sunrays R, a side shade curtain 134 may be attached to cover means 130 using a fastener 135 connecting peripheral eyelets 131a to corresponding peripheral eyelets 134a on curtain 134. The combination of cover means 130 and side curtains 134 on all sides is preferred, as this would most effectively keep the interior of a vehicle cooler to minimize the operation of an air conditioning system and associated fuel. As another feature of cover means 130, an antenna slot 132, or equivalent, may be included if cover means 130 is custom made, or subsequently formed, to accommodate the particular location of a vehicle's antenna VX. Promotional activity is also possible by suitably allocating an advertising portion 136 to either or both cover means 130 and side curtains 134. For example, automobile dealers or used car lots could place their logos on cover means 130 and or 134 to promote their business while keeping their cars shaded. The cover apparatus 100 could be given to the consumer as part of the deal.

Figures 13, 13A, 13B:
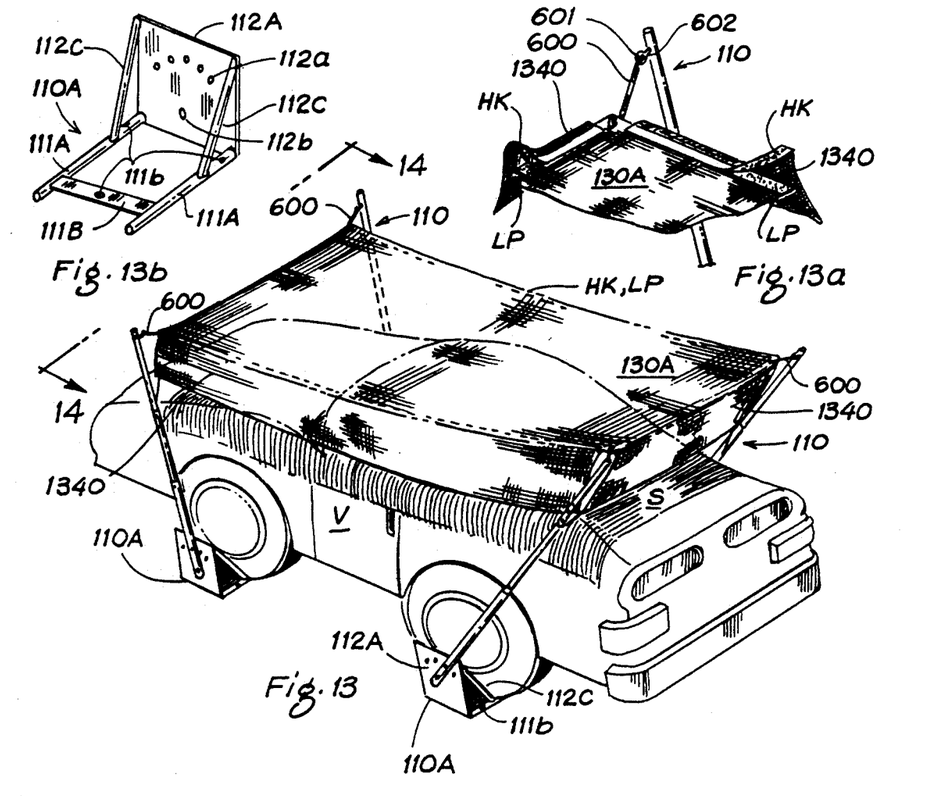
FIG. 13 is a perspective view of an alternative embodiment of the present invention illustrating a vehicle shade system with bases formed using tubular construction, a fabric cover means attached to the top pole member of the mast member by hook-terminated stretch cords, and also illustrating the side cover members detachably secured by mating strips of hook and loop fastening material.
FIG. 13a is an enlarged, partial top view of the top cover member, illustrating the detachably secured side cover members using mating strips of hook and loop fastening material.
FIG. 13b is a perspective view of the tubular constructed base member illustrating the drive-on anchored state indicator bumps formed inherently by horizontal side tubular members.

FIG. 13 shows an alternate embodiment where the base structure of the mast means 110 comprises a substantially L-shaped tubular structure 110A whose horizontal member 111A, with cross member 111B, as best seen in FIG. 13b, are equivalent to platform 111 and bump means 111a, shown in FIG. 5. Tubular structure 110A also comprises a vertical mast attachment portion 112A similar to mast attachment portion 112 shown in FIG. 5. Tubular structure 110A is provided with tubular bracing 112C extending from mast attachment portion 112C to the horizontal tubular member 111A. Side bracing 112C in FIG. 13b is equivalent to side bracing 112c shown in FIG. 5. The secondary anchor means 111b, in the form of holes, is the same for either the tubular structure 110A embodiment of FIG. 13b, or the platform structure 110a embodiment shown in FIG. 5. In the embodiment shown in FIG. 13 and in the related FIG. 13a, the cover means 130A includes side curtains 134O which are detachable from the top cover using strips of hook HK and loop LP compression type fastening means. The corners of the cover means 130A are secured to an eyelet 602 disposed on the top mast member of mast means 110 using stretch cord 600 provided with hooks 601.

As note above, FIG. 14 illustrates a frontal view of a vehicle V using the cover system with tubular base structures 110A designed to effect the offset d2 away from the vehicle's body. The offset d2 is primarily determined by the length d1 of the horizontal structure members 111A of tubular structure 110A and attachment of bracing 112C to mast attachment portion 112A, such that mast attachment portion 112A is angularly displaced more than 90 degrees with respect to horizontal member 111A.

FIG. 4 shows, in a detached position, a spring-loaded rod 137 that may be attached to a fabric M to effect a mechanized version of the cover means 130. In such mechanized version, fabric M would be rolled and retractably secured by spring 137c about rod 137 and would have ends 137a and 137b adapted for rotatable attachment to respective mast upper end portion 114 that are associated with any two adjacent mast means 110 in a vehicular application. The distal ends of the mast upper end portion 114 would be provided with a bearing means 116b for rotably extending cover fabric M, as indicated by arrow A5, towards the opposite mast means 110 having hook member 116, see generally FIGS. 3 and 3A.

FIG. 8 shows another vehicular application, namely a motorcycle application, where a single mast means 110 is used to support a cover means 130. The singular application of mast means 110 is depicted by example only, in that the motorcycle body provides a form conducive for such application and further to illustrate the versatility of the present invention. As in the automotive application, a tire T of motorcycle MB is driven onto platform portion 111 to anchor the mast means 110. The same articulation features of mast member 110b are made possible by the telescoping action of mast member 110b coacting with the compensating means associated mast attachment portion 112 having pivot and arcuate connections PB, 112b and SB, 112a, to lower mast member 113, previously discussed. A cover means 130, having mesh openings 133, is secured to an extended upper mast member 114 using hook member 116 coupled to an eyelet, such as peripheral eyelet 131a, and draped over the body and secured by a security lock SL attached to a drawstring 138.

While portability of a shelter apparatus for a vehicular and other outdoor use is most effectively accomplished by application of the invention as depicted in FIGS. 1, 8, 9 and 13, FIGS. 11 and 12 show a vehicular shelter apparatus 400 that provides portability in an alternative manner. Here, apparatus 400 is shown having structural features that allow portability by virtue of a mast means 1110 that couples to perimeter flanges RF commonly found on roofs of vehicles for cartop carriers and includes a cover means 1300 having a mechanized member 1310 coacting with a fabric member 1320. Cover means 1300 is attached to mast 1110 by a rigid mechanical latching means 1200. Cover means 1300, as shown, comprises a housing 1330 for containing fabric member 1320 coupled to mechanized member 1310 in the form of a motorized urging means that extends member 1320 as indicated by arrows A6 to shelter vehicle V.

Therefore, while the present invention has been shown and described herein in what is believed to be the most practical and preferred embodiments, it is recognized that departures can be made therefrom within the scope of the invention, which is therefore not to be limited to the details disclosed therein but is to be accorded the full scope of the claims so as to embrace any and all equivalent apparatus.

We claim:

1. A portable vehicle cover apparatus, said apparatus comprising:
   a fabric cover means for providing shelter, said cover means having a plurality of corner fastening means;
   a plurality of structurally independent mast means for rising and supporting said cover means, each independent mast means comprising a substantially L-shaped base member and a detachably and pivotally secured variable length mast member, said L-shaped base member comprising a horizontal portion for receiving a vehicle's wheels, a substantially vertical mast attachment portion, and interconnecting bracing extending from said mast attachment portion to said horizontal portion, said bracing being formed to locate said mast attachment portion at an angle greater than 90 degrees from said horizontal portion such that said detachably and pivotally secured variable length mast member will be maintained in an off-set relationship away from a vehicle utilizing said apparatus and thereby prevent inadvertent contact,
   said mast attachment portion having cover tautness compensating means in the form of a pivot hole and a plurality of arcuately arranged mounting holes to facilitate said mast member being detachably and pivotably secured, and
   said horizontal member comprises opposing tubular structure and a cross member having a second anchor facilitating means for receiving a ground driven anchor that facilitates an alternate way of anchoring said independent mast means; and
   a plurality of hook-ended stretch cord means for attaching said corner fastening means to an upper mast member of said variable length mast member to effect rising and supporting said cover means.

2. A portable vehicle cover apparatus as recited in claim 1, wherein:
   said fabric cover means includes a detachable top cover member and at least one side cover member, said fabric cover means comprises mesh sunscreen material, said top cover member having said corner fastening means, said top cover member having peripheral fastening means for facilitating securement to an edge fastening means provided on said at least one side cover member, said peripheral fastening means and said edge fastening means comprising mating hook and loop fastening material.

3. A portable vehicle cover apparatus, said apparatus comprising:
   a fabric cover means for providing shelter for a vehicle, said cover means including a detachable top cover member and at least one side cover member, said fabric cover means comprises mesh sunscreen material, said top cover member having corner fastening means, said top cover member having peripheral fastening means for facilitating securement to an edge fastening means provided on said at least one side cover member, said peripheral fastening means and said edge fastening means comprising mating hook and loop fastening material;
   a plurality of structurally independent mast means for rising and supporting said cover means, each one of said plurality of mast means being structurally independent with respect to other ones of said plurality of mast means, each independent mast means comprising a variable length mast member and a substantially L-shaped base member, said mast member being detachably secured to said base member,
   each said L-shaped base member included in said plurality of mast means comprising opposing horizontal tubular structure member and an adjacent substantially vertical mast attachment plate portion, said opposing horizontal tubular structure member forming a first anchor facilitating means for receiving a vehicle's wheel, said opposing horizontal tubular structure member comprising bump means for indicating to a driver that a vehicle is atop said L-shaped base member,
   said mast attachment plate portion having cover tautness compensating means in the form of a pivot hole and a plurality of arcuately arranged mounting holes for coacting with said detachably secured mast member to achieve a taut placement of said cover member over an object to be sheltered, such as a vehicle,
   said L-shaped base member further comprising side bracing extending downward from said mast attachment portion to respective sides of said horizontal tubular structure member, said side bracing being formed to locate said mast attachment plate portion at an angle greater than 90 degrees from said horizontal tubular structure member such that said secured variable length mast member will be maintained in an off-set relationship away from said vehicle to prevent inadvertent contact with said vehicle; and
   a plurality of hook-ended stretch cord means for attaching said corner fastening means to an upper mast member of said variable length mast member.

4. A portable cover apparatus, said apparatus comprising:
- a fabric cover member, including a detachable top cover member and at least one detachable side cover member; and
- a plurality of structurally independent mast means for rising and supporting said cover member, each one of said plurality of mast means being structurally independent with respect to other ones of said plurality of mast means, each independent mast means comprising a variable length mast member and a substantially L-shaped base member, said mast member being detachably secured to said base member, said variable length mast member also comprising a plurality of telescopically connected units having interlocking means for preventing separation of said units,
- each said L-shaped base member included in said plurality of mast means comprising a ground level horizontal member and a substantially vertical mast attachment portion,
- said mast attachment portion having cover tautness compensating means in the form of a pivot hole and a plurality of arcuately arranged mounting holes for coacting with said detachably secured mast member to achieve a taut placement of said cover member over an object to be sheltered, such as a vehicle,
- said horizontal member being shaped to form a first anchor facilitating means for receiving a vehicle's wheel, which vehicle's wheel functions as a weight anchor atop each independent mast means, said horizontal member having opposing bump means for indicating to a driver that said vehicle is atop said platform structure,
- said L-shaped base member further comprising side bracing extending downward from said mast attachment portion to respective sides of said horizontal member, said side bracing being formed to locate said mast attachment portion at an angle greater than 90 degrees from said horizontal member such that said secured variable length mast member will be maintained in an off-set relationship away from said vehicle to prevent inadvertent contact with said vehicle,
- said horizontal member further comprising opposing tubular structure and a cross member having a second anchor facilitating means for receiving a ground driven anchor that facilitates an alternate way of anchoring said independent mast means, and
- one of said telescopically connected units having a mast bottom end portion for being pivotally attached to said pivot hole and for being selectively attached to one of said plurality of arcuately arranged mounting holes.

5. A portable cover apparatus as recited in claim 4, wherein said cover apparatus further comprising:
- at least one ground driven anchor; and
- bag means for storing said at least one anchor, said cover member and said plurality of independent mast means, and for facilitating portability of said cover apparatus, and
- said fabric cover member comprises mesh sunscreen material, said top cover member having corner fastening means for being detachably secured to an upper mast member, and also having side fastening means for detachably securing to corresponding fastening means on said side fabric cover members.

6. A portable cover apparatus as recited in claim 4, wherein:
- said apparatus further comprises a plurality of hook-ended stretch cord members, a first hook end of each stretch cord member being detachably secured to a respective corner of said cover member, and a second hook end of each stretch cord member being detachably secured to an upper mast member of said variable length mast member.

7. A portable cover apparatus as recited in claim 4, wherein:
- said fabric cover member comprises mesh sunscreen material, said top cover member having peripheral fastening means for facilitating securement to an edge fastening means provided on said at least one side cover member, said peripheral fastening means and said edge fastening means comprising hook and loop fastening material.

* * * * *